UNITED STATES PATENT OFFICE.

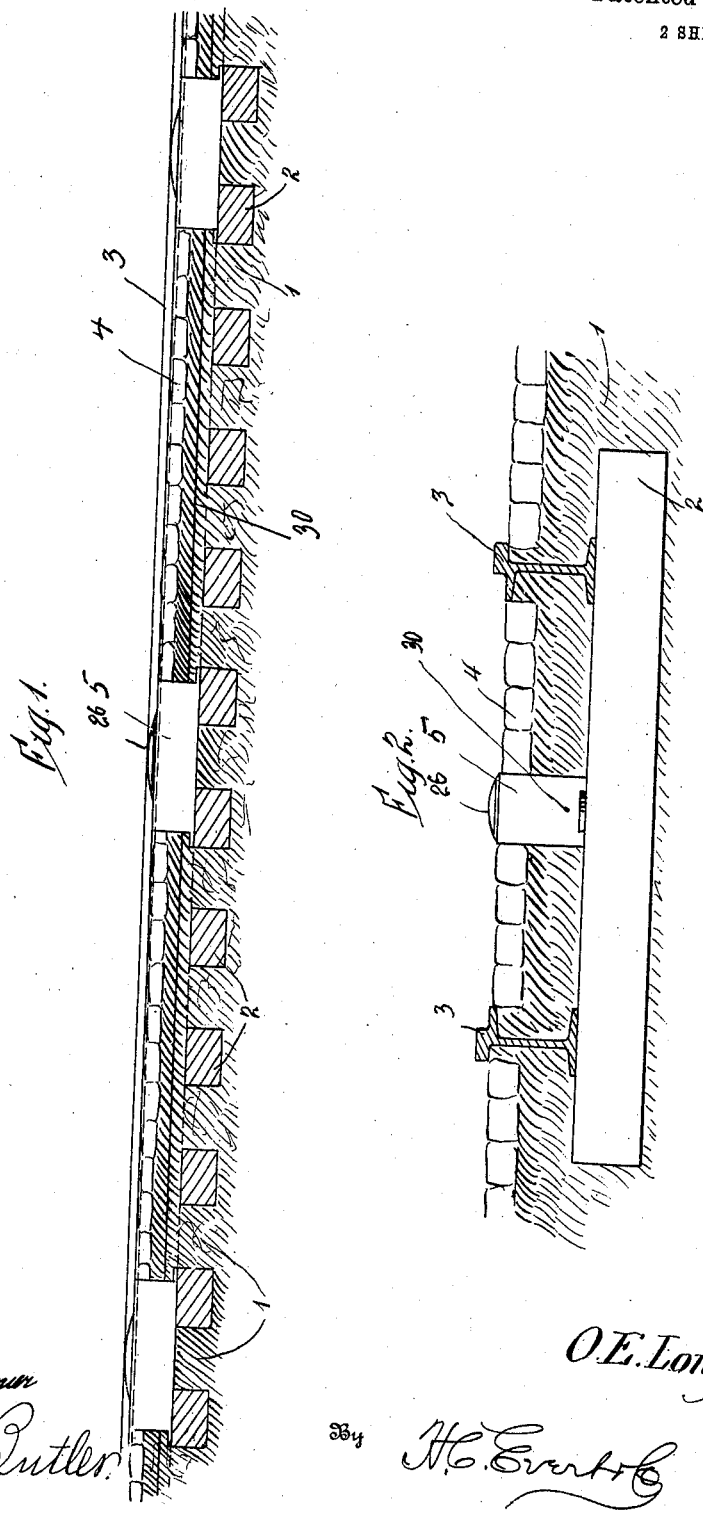

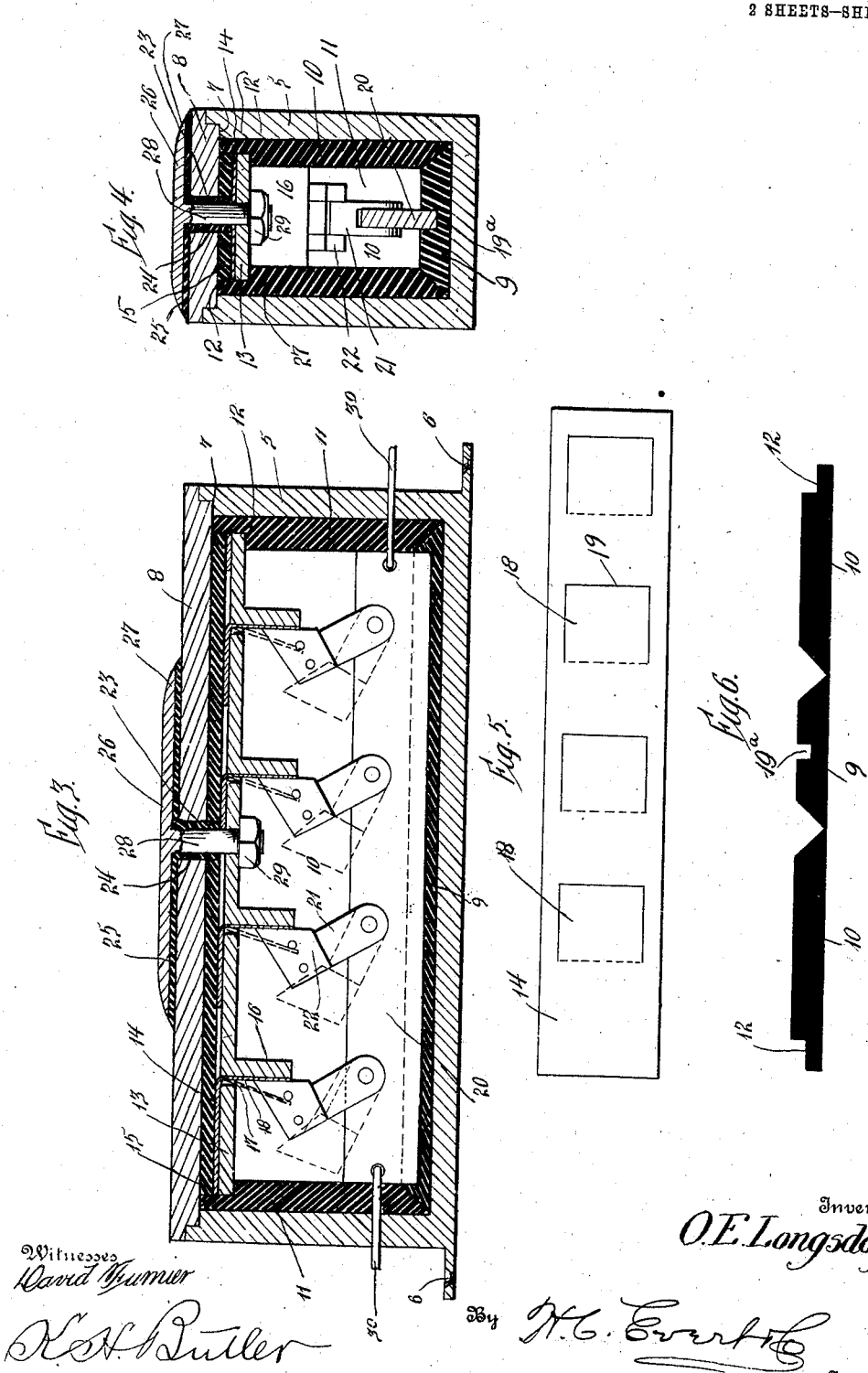

OWEN E. LONGSDORF, OF CRAFTON, PENNSYLVANIA.

SYSTEM OF ELECTRIC TRACTION.

980,540. Specification of Letters Patent. Patented Jan. 3, 1911.

Application filed July 23, 1909. Serial No. 509,222.

*To all whom it may concern:*

Be it known that I, OWEN E. LONGSDORF, a citizen of the United States of America, residing at Crafton, in the county of Allegheny and State of Pennsylvania, have invented certain new and useful Improvements in Systems of Electric Traction, of which the following is a specification, reference being had therein to the accompanying drawing.

This invention relates to an electric traction system for railways, particularly surface railways.

The objects of the invention are to obviate the necessity of using a third rail, trolley wire or other objectionable system for conducting electricity along lines of electric railways, and to furnish simple and effective means for the transmission of an electric current to cars traveling over a track or prescribed path.

Other objects of the invention are to provide an electric traction system wherein a plurality of equally spaced conductor sections are arranged to be successively energized through the agency of a suitable source of electrical energy and magnets carried by cars, thus economizing in the use of material and reducing the expense of maintenance to a minimum in connection with street railways; and to provide a system of electric traction that can be used where the overhead system of wiring is objectionable, due to the installation of poles and wiring that tends to obstruct a street.

Briefly described, the invention is of that type wherein a plurality of equally spaced contact blocks are located throughout the system between the rails of the tracks, these contact blocks being connected to a suitable source of electrical energy and energized by a shoe of a car contacting with the same, the shoe of the car being either of a sufficient length to contact with one block before leaving the other, or to give sufficient impetus to a car to carry it from one block to the other.

In designing my invention, I have aimed to provide contact blocks that can be safely used and built in sections or self-contained units, each complete in itself and ready to be placed in position, these contacting blocks being unobtrusive, so as not to interfere with the travel of vehicles or animals.

The invention is susceptible to embodiment in a variety of specific structures, and it will therefore be understood that I do not care to confine myself to the particular embodiment herein shown and described.

Before describing the preferred construction of my invention, reference will be had to the drawings forming a part of this specification, wherein:—

Figure 1 is a longitudinal sectional view of a portion of a street railway track, constructed with my system, Fig. 2 is a cross sectional view of the same, Fig. 3 is an enlarged longitudinal sectional view of one of the self-contained units of the system, Fig. 4 is a cross sectional view of the same, Fig. 5 is a plan of a conductor plate of a unit, and, Fig. 6 is an edge view of an insulating lining for one of the units of the system.

In the drawings:—1 denotes a road-bed having ties or sleepers 2 supporting rails 3 constituting a track over which a car is adapted to travel.

Between the rails 3 are arranged a plurality of equally spaced conductor units, these units being arranged in longitudinal alinement throughout the length of a track and upon the ties 2, with portions of each unit, (these portions to be hereinafter termed contact blocks) exposed above the paving 4 of a street or road provided with a railway track, whereby a car provided with a contact shoe (not shown) can move along the track, the propulsion of the car being accomplished through the medium of the contact shoe thereof engaging the contact blocks of the system units.

Each unit comprises a non-magnetic box or casing 5 having the ends thereof provided with apertured lugs 6 whereby the box or casing can be secured upon one or more ties or sleepers 2. The upper edges of the box or casing 5 are cut away to provide shoulders 7 for supporting a non-magnetic cover or lid 8, the upper face or surface of which is flush with the paving 4 when the box is positioned in the road bed.

In the box or casing 5 is placed a lining or shell of non-conductive or insulating material, comprising an integral bottom plate 9 and side walls 10, with detachable or separate end walls 11. The upper edges of the walls 10 and 11 are cut away to provide a seat 12 for an upper conductor plate 13, preferably made of soft iron, on which is placed an auxiliary conducting plate 14, preferably made of copper; on this latter plate is a non-conductive or insulation plate 15, the latter in conjunction with the lining or shell (parts 9, 10 and 11) providing a complete casing of insulation upon the inner sides of the box or casing 5 and underside of the lid 8.

The conductor plate 13 is provided with a plurality of depending equally spaced contact members 16, and said conductor plate adjacent to each member is provided with a transverse slot 17 to receive a depending resilient extension 18 formed by cutting away and shearing the plate 14, as at 19 and bending the cut and sheared portions of the plate downwardly through the slot 17. The extensions 18 extend downwardly through the slots 17 at an angle to the vertical and consequently, normally lie out of contact with the members 16.

The bottom plate 9 of the lining or shell is provided with a longitudinal groove 19ª for a lower conducting plate 20. Pivotally connected to this plate, beneath the contacting members 16 are bifurcated arms 21 having the free ends thereof provided with armatures 22, adapted to engage the extensions 18 of the plate 14 and move said extensions into engagement with the members 16. The armatures are normally supported out of engagement with the extensions 18 by the arms 21 resting upon the upper edge of the plate 20.

It is preferable to employ the insulation plate 15 over the conductor plate 13 in order to effectually insulate all the metallic parts within the box and to obviate danger of exposing a portion of the conductor plates 13 and 14, should the cover 8 of the box be accidentally broken.

The conductor plate 14 may, if desired, be dispensed with, but I have found that by the use of this thin plate with the yieldable contacts projecting toward the armature in the manner shown, it prevents any tendency to arch and holds the armatures against any tendency to wabble when attracted.

The cover or lid 8 and the plate of insulation 15 are provided with vertical alining openings 23 intermediate the ends of each box or casing and in each of these openings is placed a sleeve of insulation 24 connecting with a plate of insulation 25 located upon the cover or lid 8. Mounted upon the plate of insulation 25 is an oblong contact block 26 having beveled ends 27. This block is provided with a depending stem 28 extending through the sleeve of insulation 24 and through the plates 13 and 14, the lower end of said stem being threaded to receive a nut 29 employed for retaining the contact block 26 upon the box or casing and connected to the conductor plate 13.

The lower conductor plate 20 of one unit is connected to the lower conductor plate of the associated units by conductors or cables 30, said conductors or cables extending through the ends of the box or casing and being embedded beneath the paving 4.

The conductors or cables 30 and the lower conductor plates 20 are in circuit with a suitable source of electrical energy, and when a magnetic shoe carried by a car wipes or contacts with the block 26, the armatures 22 are elevated and through the medium of the extensions 18 form a positive contact with the members 16, giving the car sufficient impetus or electrical energy to travel from one contact block to another, without causing a jerky or irregular movement of the car.

My system of electrical traction is applicable to elevated or subway roads, and while I have not shown nor described a car adapted to be used in connection with said system, it is to be understood that cars equipped with various kinds of shoes can be used in connection with the system.

Having now described my invention what I claim as new, is:—

1. In a traction system for electric railways, the combination with a track, of a plurality of equally spaced non-magnetic boxes located in said track, shells of insulation located in said boxes, a lower conductor plate arranged in each box and connecting electrically with the lower conductor plates of other boxes, an upper conductor plate arranged in each box, depending contact members carried by said upper conductor plate, an auxiliary conducting plate located above said upper conductor plate and having depending resilient extensions protruding through said upper conductor plate to engage said depending contact members, an insulated contact block carried by each box and connecting with said upper conductor plate, and a plurality of pivoted armatures carried by said lower conductor plate and adapted to engage the extensions of said auxiliary conducting plate and move said extensions into engagement with the contact members of the upper conductor plate.

2. A contact box for electric railway systems consisting of a box of non-magnetic material provided with a cover of non-magnetic material, an insulation lining for said box, a conductor plate seated in said insulation lining and carrying a series of pivoted arms, armatures carried by said arms, superposed conductor plates mounted in the upper edge of said insulation lining, the lower of said superposed plates provided with depending contact members and having slots, and the upper of said superposed plates having extensions projecting through said slots and normally out of contact with said contact members, and a contact block mounted on the cover of said box and insulated therefrom and having a stem extending through said superposed conductor plates.

3. A contact box for electric railway systems consisting of a box and a removable cover therefor, a lining of insulation in said box, a lower conductor plate seated in said lining of insulation and carrying a plurality of armatures, superposed conductor plates mounted in the upper portion of said box, the lower of said plates having depending contact members and provided with slots, and the upper of said plates being composed of a thin sheet of conducting material having extensions projected through said slots in the lower plate, and a contact block mounted on the cover of said box and insulated therefrom and having a stem extending through said superposed conductor plates and secured thereto.

4. In an electric railway system, a contact box provided with a vertically disposed longitudinally extending conductor plate, a series of armatures pivoted to said plate and normally resting in inactive position thereon, superposed conductor plates in the upper portion of said box, the lower of which is provided with depending contact members and also provided adjacent said members with slots, the upper of said plates having extensions projected through said slots and lying in proximity to but normally out of engagement with said contact members, and a contact block mounted on the cover of said box and having a stem projecting through the cover and through said superposed conductor plates and secured thereto.

5. In an electric railway system, a unit comprising a contact box, a lining of insulation therein, a lower conductor plate mounted in said insulation, a plurality of pivoted armatures carried by said lower conductor plate, superposed conductor plates in the upper portion of said box, the lower of said superposed plates provided with depending contact members and the upper of said superposed plates having extensions projected through the lower plate in proximity to said contact members and normally out of engagement therewith, and a contact block mounted on the cover of said box and having a stem projecting through the superposed conductor plates and insulated from the cover of said box.

6. A contact box for electric railway systems, consisting of a box and a removable cover therefor, a lining of insulation in said box, a conductor plate seated in the bottom plate of said insulation lining disposed edgewise and extending substantially the length of the box, a series of arms pivoted to said conductor plate to have swinging movement thereon, armatures carried by said arms, an upper conductor plate seated in the insulation lining near the top of the box and provided with depending contact members, one for each armature, and a contacting block mounted on the cover of said box and insulated therefrom and having a stem extending through said cover and the top of the insulation lining and engaging the last-named conductor plate.

In testimony whereof I affix my signature in the presence of two witnesses.

OWEN E. LONGSDORF.

Witnesses:
KARL H. BUTLER,
MAX H. SROLOVITZ.